United States Patent
Maeda

(10) Patent No.: US 6,384,567 B1
(45) Date of Patent: May 7, 2002

(54) CONTROLLER AND CONTROL METHOD FOR MOTOR/GENERATOR

(75) Inventor: Shoichi Maeda, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/717,302

(22) Filed: Nov. 22, 2000

(30) Foreign Application Priority Data

Nov. 26, 1999 (JP) ............................................ 11-335351

(51) Int. Cl.⁷ ................................................. H02P 5/34
(52) U.S. Cl. ......................... 318/801; 318/434; 322/28
(58) Field of Search ................................ 318/148, 152, 318/432, 433, 434, 798, 801; 322/19, 28

(56) References Cited

U.S. PATENT DOCUMENTS

| | | | |
|---|---|---|---|
| 5,389,749 A | * 2/1995 | Hokari et al. | 187/293 |
| 5,568,023 A | * 10/1996 | Grayer et al. | 318/139 |
| 5,646,510 A | * 7/1997 | Kumar | 322/16 |
| 5,650,713 A | * 7/1997 | Takeuchi et al. | 322/16 |
| 5,652,485 A | * 7/1997 | Spiegel et al. | 318/147 |
| 5,661,378 A | * 8/1997 | Hapeman | 318/52 |
| 5,751,069 A | * 5/1998 | Rajashekara et al. | 290/40 |
| 5,907,191 A | * 5/1999 | Sasaki et al. | 290/19 |
| 5,916,130 A | * 6/1999 | Nakae et al. | 60/276 |
| 6,049,152 A | 4/2000 | Nakano | 310/414 |

FOREIGN PATENT DOCUMENTS

| | | |
|---|---|---|
| JP | 5992772 | * 5/1984 |
| JP | 7102987 | * 4/1995 |
| JP | 10-028304 | 1/1998 |
| JP | 11-275826 | 10/1999 |
| JP | 11-356099 | 12/1999 |
| JP | 11-356100 | 12/1999 |

* cited by examiner

*Primary Examiner*—Jeffrey Donels
*Assistant Examiner*—Rina I. Duda
(74) *Attorney, Agent, or Firm*—Foley & Lardner

(57) ABSTRACT

A motor/generator (20) is provided with plural groups of coils (6), and inverters (30) supplying a polyphase AC current converted from a DC current to each group of coils (6) in response to pulse width modulation signals output by a microprocessor (25, 35). The microprocessor (25, 35) is programmed to prevent increases in high frequency components in the polyphase AC current by controlling a specific inverter (30) to stop supplying the polyphase AC current (S20), when a load on the motor/generator is smaller than a reference load (S12). As a result, energy conversion efficiency of the motor/generator at low loads is improved.

9 Claims, 6 Drawing Sheets

8 ACCELERATOR PEDAL DEPRESSION AMOUNT SENSOR
9 VEHICLE SPEED SENSOR
10 VEHICLE CONTROLLER
21 DRIVE CIRCUIT
26 ROTATION POSITION SENSOR
27 ROTATION SPEED SENSOR
33 TEMPERATURE SENSOR
35 FIRST CONTROLLER
37 VOLTAGE SET UP CONTROL CIRCUIT
38 REGENERATION CONTROL CIRCUIT

CONTROLLER AND CONTROL METHOD FOR MOTOR/GENERATOR

FIELD OF THE INVENTION

This invention relates to a controller for a motor/generator which drives a plurality of rotors with a single stator coil.

BACKGROUND OF THE INVENTION

Tokkai Hei 11-275826 published by the Japanese Patent Office in 1999 discloses a synchronous motor/generator which drives a plurality of rotors independently by applying composite polyphase alternating currents to stator coils.

The invention disclosed in Tokkai Hei 11-275826 is a part of U.S. Pat. No. 6,049,152 that was issued in the United States after the priority date of this patent application.

In this motor/generator, the alternating currents supplied to the coils are generated by providing inverters for each phase of the coils and by supplying a pulse width modulation signal (hereafter referred to as PWM signal) to the base of a transistor constituting each inverter.

SUMMARY OF THE INVENTION

Since electrical power supplied to each coil is equal in this motor/generator, a duty ratio of the PWM signal is low when a load on the motor/generator is low. That is to say, the pulse width is narrowed. As a result, the current applied to the coil comprises numerous high frequency components during low load.

However high frequency components increase core loss in the motor/generator and the conversion efficiency from electrical energy to mechanical energy is reduced.

Further, in this motor/generator, when a part of the inverter is malfunctioning, torque generated by the rotor is reduced and sometimes the rotor is caused to stop.

It is therefore an object of this invention to improve energy conversion efficiency during low load running in a motor/generator.

It is a further object of this invention to prevent reductions in torque generated in the rotor resulting from malfunctioning of the inverter.

In order to achieve the above objects, this invention provides a controller for a motor/generator that has a plurality of groups of coils and is operated by supplying a polyphase alternating current to each of the plurality of groups of coils. The controller comprises a plurality of inverters each of which converts a direct current into the polyphase alternating current and supples the polyphase alternating current to each of the plurality of groups of coils in response to an input signal. The controller further comprises a sensor which detects a load of the motor/generator, and a microprocessor programmed to compare the load with a reference load, and control the input signal to a specific inverter to stop supplying the polyphase alternating current when the load is smaller than the reference load.

This invention also provides a method for controlling a plurality of inverters which drive a motor/generator. The motor/generator comprises a group of coils. Each of the inverters converts a direct current into a polyphase alternating current and supplies the polyphase alternating current to each of the plurality of groups of coils in response to an input signal. The control method comprises detecting a load of the motor/generator, comparing the load with a reference load, and controlling the input signal to a specific inverter to stop supplying the polyphase alternating current when the load is smaller than the reference load.

The details as well as other features and advantages of this invention are set forth in the remainder of the specification and are shown in the accompanying drawings.

DESCRIPTION OF THE PREFERRED EMBODIMENTS

Figure 1:
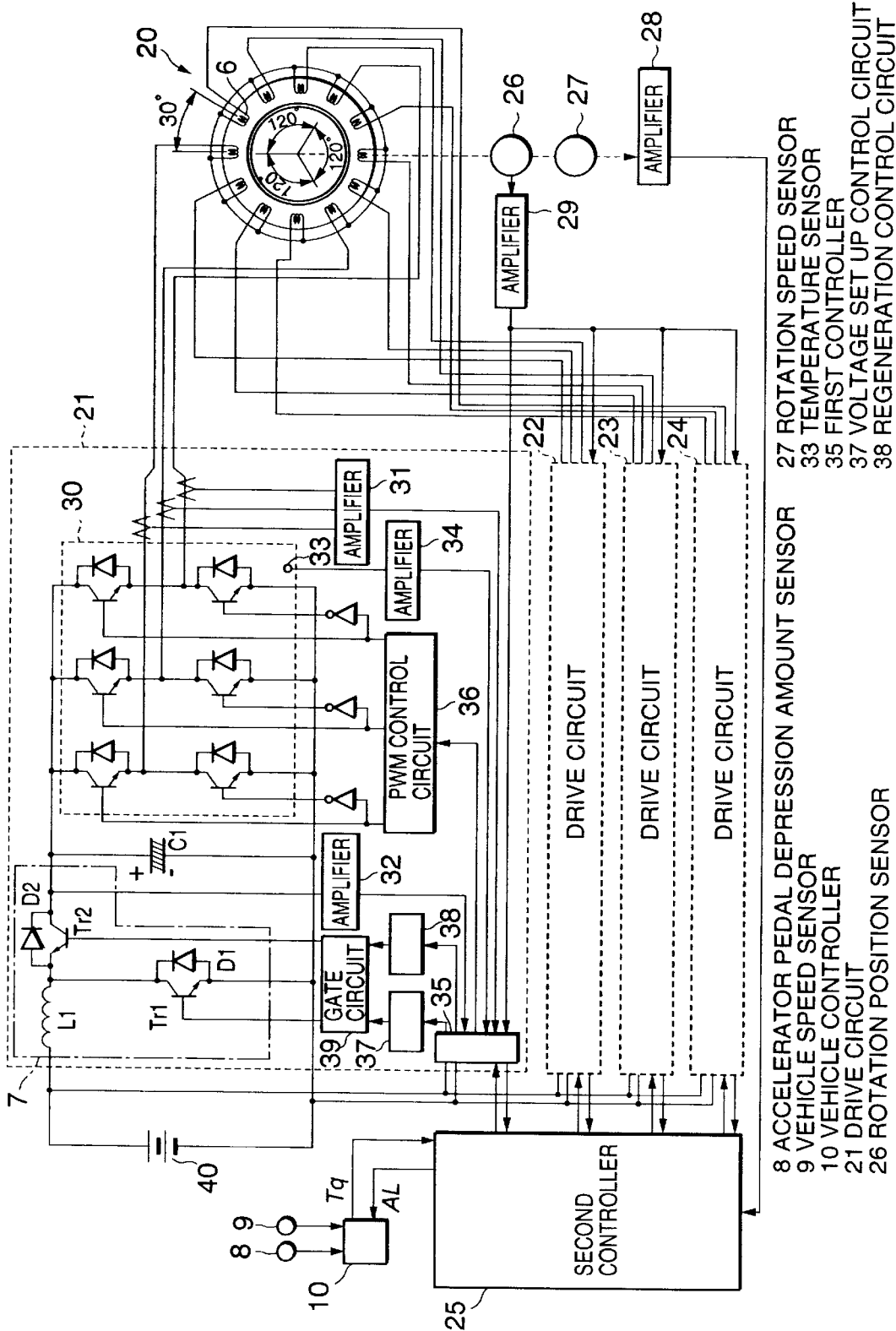
FIG. 1 is a circuit diagram of a controller for a motor/generator according to this invention.

Referring to FIG. 1 of the drawings, a motor/generator 20 for a hybrid vehicle is driven by four groups of three-phase alternating currents (hereafter referred to as AC currents) generated by drive circuits 21, 22, 23, and 24. The motor/generator 20 is the same as the motor/generator 1 disclosed in FIGS. 1–4 of U.S. Pat. No. 6,049,152.

The motor/generator 20 may be schematically described as comprising ring-shaped stators provided with twelve coils 6, an inner rotor disposed on an inner side of the stators and an outer rotor disposed on an outer side of the stator. The inner rotor comprises a magnet with an S pole in one semicircular section and an N pole in another semicircular section. The outer rotor comprises a magnet with two S poles and two N poles. These four poles are disposed alternately in intervals of 90 degrees. This invention may be adapted to other types of motor/generators using a plurality of groups of three-phase AC currents.

The twelve coils 6 of the motor/generator 20 are disposed at equal angular intervals and a single group is comprised by three coils 6 arranged at 120-degree intervals. Four groups result from this arrangement. Each group of coils 6 is connected to drive circuits 21, 22, 23, 24 and a three-phase AC current is supplied to each group of coils 6 from the drive circuits 21, 22, 23, 24.

The drive circuits 21, 22, 23, 24 have the same structure. The drive circuit 21 is provided with an inverter 30, a temperature sensor 33, a first controller 35, a PWM control circuit 36, a voltage step up control circuit 37, a regeneration control circuit 38, a gate circuit 39 and a voltage step up converter 7.

The voltage step up converter 7 comprises a reactor L1, transistors Tr1, Tr2, diodes D1, D2 and a capacitor C1. An output signal from the voltage step up control circuit 37 is output through the gate circuit 39 and is input into the base of the transistor Tr1. This signal switches the transistor Tr1 between an ON and OFF position. When in the OFF position, a high voltage is generated by the battery 40 in the reactor L1. The voltage step up converter 7 outputs a high voltage current in response to the output signal of the voltage step up control circuit 37 by storing this electrical energy in the capacitor C1. Higher voltages are obtained by reducing the ON and OFF alternation cycle of the transistor Tr1. The output voltage of the voltage step up converter 7 is applied to the inverter 30.

The inverter 30 is provided with two diodes and two transistors in each of three phases. A fixed AC current is generated by the two transistors repeating ON and OFF positions in reverse phases in response to reverse-phase PWM signals output from the PWM control circuit 36. The inverter 30 varies the voltage driving the motor/generator 20 in response to variations in the output voltage of the voltage step up converter 7. Thus although a standard PWM control inverter is used, it is possible to perform voltage control with an accuracy similar to that obtained by pulse amplitude modulation.

The motor/generator can be driven by the rotational energy of the vehicle drive wheels. That is to say, when the vehicle is decelerating, the electrical power generated by the motor/generator 20 is regenerated to the battery 40 through the transistor Tr2 by switching the transistor Tr2 to an ON position with a signal from the regeneration control circuit 38. The reactor L1 reduces noise in the regenerated current supplied to the battery 40.

The output current Ip of the inverter 30 is input to the motor/generator 20. It is also input to the first controller 35 through an amplifier 31.

A temperature detected by the temperature sensor 33 is input to the first controller 35 through an amplifier 34. A signal from the motor rotation position sensor 26 which detects the rotation position of the motor/generator 20 is input to the first controller 35 through an amplifier 29. The output voltage from the voltage step up converter 7 is input to the first controller 35 through an amplifier 32.

The first controller 35 controls the PWM control circuit 36, the voltage step up control circuit 37 and the regeneration control circuit 38 based on the rotation position of the motor/generator 20, the temperature of the inverter 30 the output voltage of the voltage step up converter 7, the output current of the inverter 30, and a signal output from a second controller 25. The gate circuit 39 switches the output signal so that signals from the voltage step up control circuit 37 and the regeneration control circuit 38 are not output simultaneously. The detected temperature from the temperature sensor 33, the output voltage from the voltage step up converter 7, and the output current from the inverter 30 are input into the second controller 25 through the first controller 35 together with the rotation position of the motor/generator 20.

The structure of the other drive circuits 22, 23, 24 is the same as that of the drive circuit 21 described above.

The first controller 35 and the second controller 25 respectively comprises a microcomputer provided with a central processing unit (CPU), a read-only memory (ROM), a random access memory (RAM) and an output interface (I/O interface).

A signal from a rotation speed sensor 27 which detects a rotation speed of the motor/generator 20 is input to the second controller 25 through an amplifier 28. A signal indicating the presence or absence of an abnormality in the inverter 30 in each drive circuit 21, 22, 23, 24 is input to the second controller 25 from the first controller 35 of each drive circuit 21, 22, 23, 24.

The second controller 25 calculates and outputs a torque control value to the first controller 35 of each drive circuit 21, 22, 23, 24 based on the above signals and a torque command signal Tq given from the outside. The torque command signal Tq is determined by a vehicle controller 10 based on a vehicle accelerator pedal depression amount detected by an accelerator pedal depression amount sensor 8 and a vehicle speed detected by a vehicle speed sensor 9.

Figure 2:
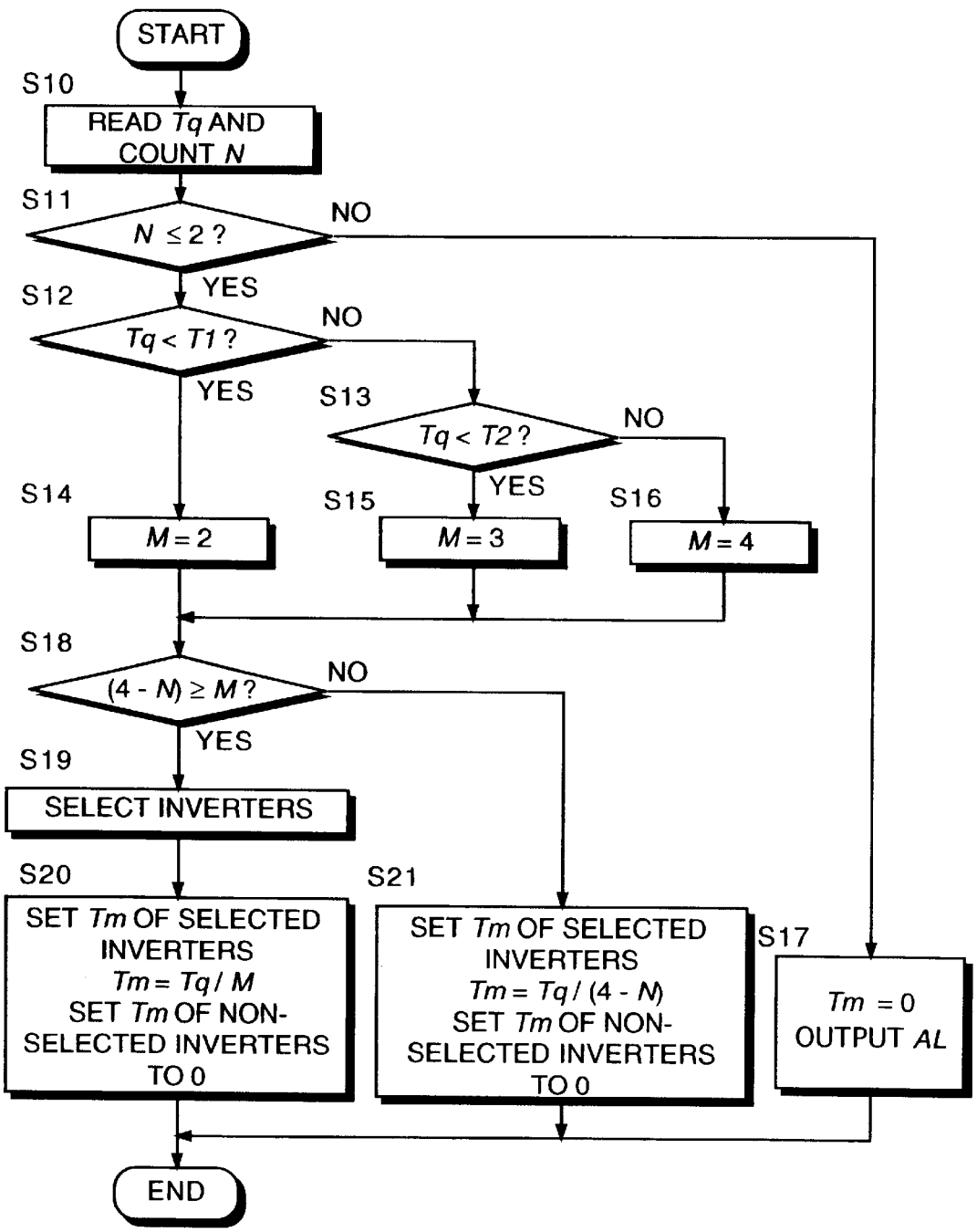
FIG. 2 is a flowchart of a routine for calculating a torque control value Tm executed by a second controller according to this invention.

FIG. 2 shows a torque control value calculation routine executed by the second controller 25. This routine is executed at intervals of 10 milliseconds, for example.

Firstly in a step S10, the second controller 25 reads a torque command signal Tq. A number N of abnormalities representing the total number of abnormally functioning inverters 30 is counted up based on the abnormality signal input from each first controller 35.

Then in a step S11, it is determined whether or not the number N of abnormalities is less than or equal to 2. When N is greater than 2, that is to say, when for example three or four inverters 30 are malfunctioning, the routine proceeds to a step S17. In the step S17, the operation of all inverters 30 is terminated by outputting a torque control value Tm=0 to all drive circuits 21, 22, 23, 24. The second controller 35 warns a driver of the vehicle that the inverters 30 are not functioning by outputting a warning signal AL to for example turn on a warning light provided on an instrument panel of the vehicle. On completion of the step S17, the routine is terminated.

When the number of abnormalities is less than or equal to 2 in the step S11, the routine proceeds to a step S12. In the step S12, it is determined whether or not the torque command signal Tq is smaller than a first fixed torque T1.

When Tq is smaller than T1, the routine proceeds to a step S14.

In the step S14, after a number M of inverters 30 to be operated is set to two, the routine proceeds to a step S18. The reason why the number M of inverters 30 to be operated is limited to two is because it is possible to generate a torque corresponding to the torque command signal Tq by operating two inverters 30 since the torque command signal Tq is small. When the number N of abnormalities is less than or equal to two, at least two of the inverters 30 of the drive circuits 21, 22, 23, 24 are normally functioning. Thus, when the number N of abnormalities is less than or equal to two in the step S11, it is possible to operate two inverters 30 normally.

In a step S12, when the torque command signal Tq is greater than or equal to a first fixed torque T1, the routine proceeds to a step S13.

In the step S13, it is determined whether or not the torque command signal Tq is smaller than a second fixed torque T2. The second fixed torque T2 is set to a value which is greater than the first fixed torque T1.

When Tq is smaller than T2, the routine proceeds to a step S15.

In the step S15, the routine sets the number M of inverters 30 to be operated to three and proceeds to a step S18. When the torque command signal Tq is greater than or equal to the second fixed torque T2 in the step S13, the routine sets the number M of inverters 30 to be operated to four in a step S16 and proceeds to the step S18.

In the step S18, it is determined whether the number of normally functioning inverters 30 is greater than or equal to a number M of inverters 30 to be operated. The number of normally functioning inverters 30 is obtained by subtracting the number N of abnormally functioning inverters 30 from the total number of four inverters 30.

When the result of the determination in the step S18 is affirmative, the routine proceeds to a step S19 and selects the inverters 30 to be operated. Then in a step S20, a torque control value Tm of each inverter 30 to be operated is set using equation (1). The torque control value Tm of non-selected inverters 30 is set to zero and after the torque control value Tm is respectively output to the drive circuits 21, 22, 23, 24, the routine is terminated.

$$Tm=Tq/M \quad (1)$$

When the result of the determination in the step S18 is negative, the routine proceeds to a step S21. Here the torque control value of each inverter 30 to be operated is set using equation (2). The torque control value Tm of non-selected inverters 30 is set to zero and after the torque control value Tm is respectively output to the drive circuits 21, 22, 23, 24, the routine is terminated.

$$Tm=Tq/(4-N) \quad (2)$$

Figure 3:
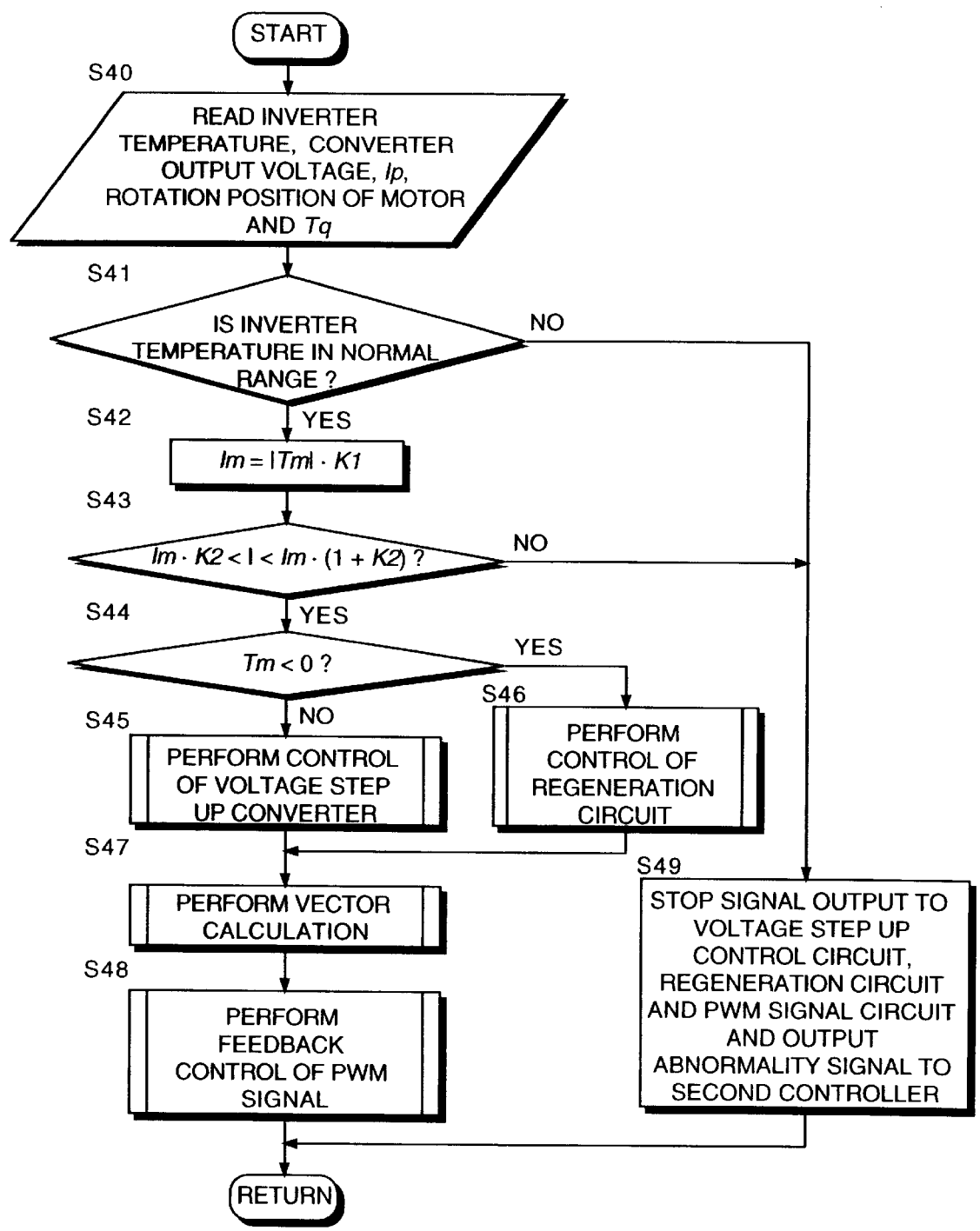
FIG. 3 is a flowchart of a current control routine executed by a first controller according to this invention.

Based on the torque control value Tm input from the second controller 25, the first controller 35 in each of the drive circuits 21, 22, 23, 24 executes the current control routine shown in FIG. 3.. This routine is executed at intervals of 1 millisecond, for example.

Firstly, in a step S40, the temperature of the inverters 30, the output voltage of the voltage step up converter 7 applied to the inverters 30, the output current Ip of the corresponding inverter 30, the rotation position of the motor/generator 20 and the torque control value Tm calculated by the second controller 25 are read.

In a step S41, it is determined whether or not there is an abnormality in the corresponding inverter 30 by comparing the temperature of the inverter 30 with a fixed temperature.

When an abnormality is detected in the inverter 30, the routine proceeds to a step S49. When there is no abnormality detected in the inverter 30, the routine proceeds to the step S42.

In the step S42, a target current Im is calculated using equation (3) based on the torque control value Tm input from the second controller 25.

$$Im=|Tm"\cdot K1 \quad (3)$$

where, K1=coefficient.

In a step S43, it is determined whether the relationship of the target current Im and the actual output current I of the inverters 30 satisfies equation (4).

$$Im\cdot K2<I<Im\cdot(1+K2) \quad (4)$$

where, K2=coefficient smaller than one.

When the actual output current I of the inverter 30 is outside of the above range, it is determined that there is an abnormality in the inverter 30 and the routine proceeds to a step S49.

When the inverter 30 is malfunctioning, it is often the case that the actual output current I is zero or near to zero. Malfunctions almost never result in values which are well above the target current Im. Thus equation (5) may be used in place of equation (4) to perform the determination in the step S43.

$$Im-K2<I<Im+K2 \quad (5)$$

As shown above, temperature and current may be used in the routine in order to determine an abnormality in the inverters 30. However it is also possible to use a voltage value as a parameter to determine abnormalities.

When the relationship of equation (4) in the step S43 is satisfied, the routine proceeds to a step S44.

In the step S44, it is determined whether or not the torque control value Tm is negative. The torque control value Tm takes negative values when the motor/generator 20 is functioning as a generator. In this case, the routine proceeds to a step S46 and performs control of the regeneration control circuit 38 in order to store generated electricity from the motor/generator 20 in the battery 40 by outputting a signal to the regeneration control circuit 38. After completion of the step S46, the routine proceeds to a step S47.

If the torque control value Tm does not take a negative value, the routine proceeds to a step S45 and raises the output voltage of the voltage step up converter 7 in response to a torque control value Tm in order drive the motor/generator 20 as a motor by outputting a signal to the voltage step up control circuit 37. After completion of the step S45, the routine proceeds to a step S47.

In the step S47, vector calculation of the output current of the drive circuits 21 (22, 23, 24) is performed. Vector calculation comprises calculating a torque component current from the rotation speed and the torque control value Tm of the motor/generator 20. The magnetic component current is calculated from the torque component current and the torque control value Tm.

In a following step S48, feedback calculation of the PWM signal is performed based on the actual output current/and these component currents. A signal corresponding to the calculation result is output to the PWM control circuit 36 and the routine is terminated.

The processing performed in steps S45–S48 corresponds to the control of a normal motor/generator as disclosed in Tokkai Hei 10-28304 published by the Japanese Patent Office in 1998, and Tokkai Hei 11-356099 and Tokkai Hei 11-356100 published by the Japanese Patent Office in 1999.

In the step S41 or the step S43, when it is determined that there is an abnormality in the inverter 30, the routine proceeds to a step S49. In the step S49, the routine terminates the signal output to the voltage step up control circuit 37, the regeneration control circuit 38 and the PWM control circuit 36 and outputs an abnormality signal which notifies the second controller 25 of an abnormality in the inverter 30. After the processing of the step S49, the routine is terminated.

The control routine of the second controller 25 varies the number of inverters 30 to be operated in response to the magnitude of the torque command signal Tq. As a result, the number of inverters 30 to be operated is reduced at low loads and the load allocated to each of the inverters 30 during operation is increased. That is to say, since the duty ratio of the PWM signal for driving each inverter 30 during low load is increased, high frequency components in the current applied to the coils 6 are reduced. As a result, the core loss of the motor/generator 20 is reduced.

On the other hand, when the number of non-operating inverters 30 is increased, the switching loss of the inverters is reduced. Therefore the application of this routine allows improvements in the energy efficiency of the motor/generator 20 when operating at low loads.

Furthermore since normally functioning inverters 30 are operated by the torque control value Tm determined in response to a number N of abnormalities, when any one of the inverters 30 develops an abnormality, continuous operation of the motor/generator 20 is possible without reductions in generated torque.

Figure 4:
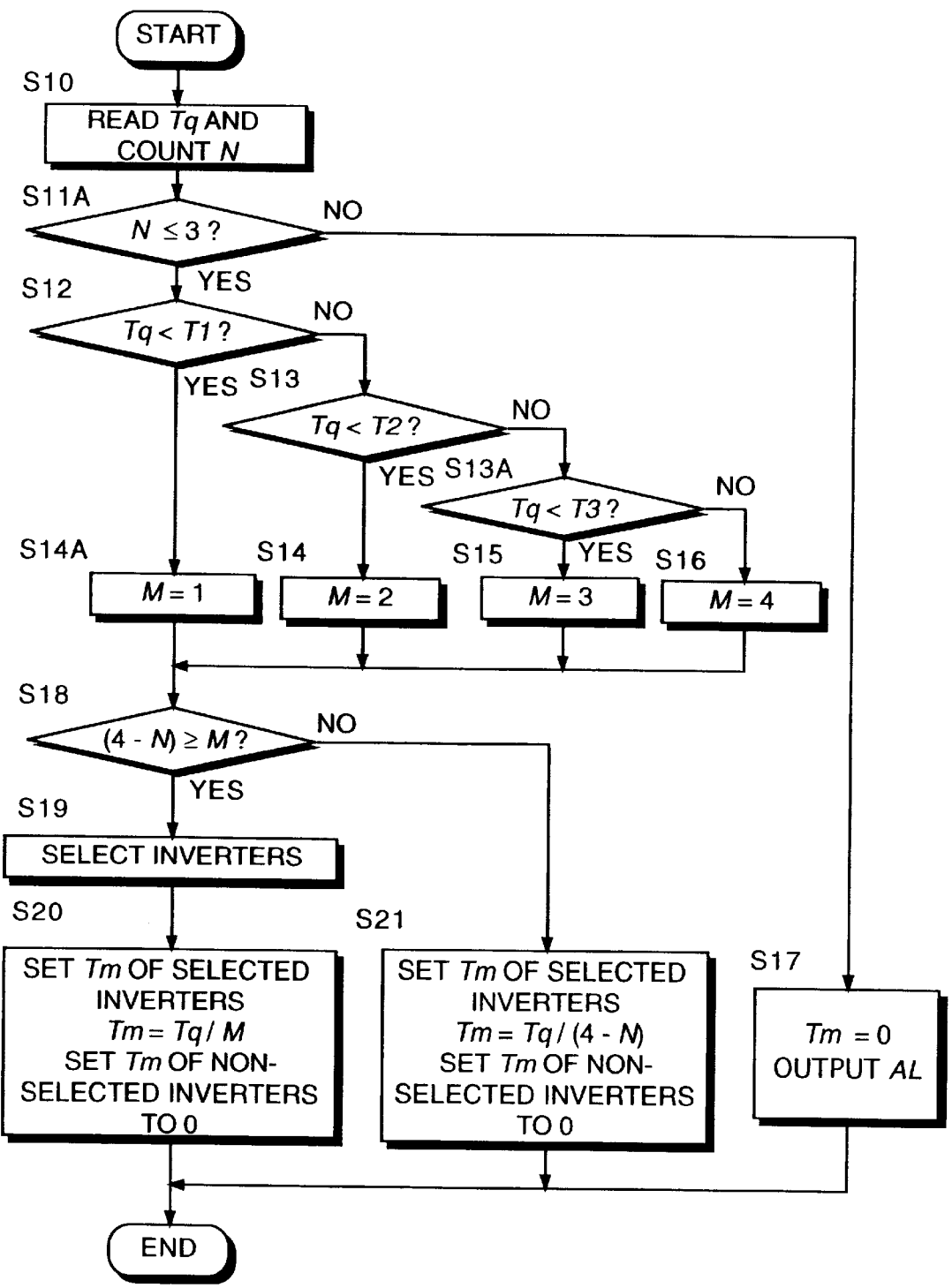
FIG. 4 is similar to FIG. 2, but showing a second embodiment of this invention.

FIG. 4 shows a control routine executed by the second controller 25 according to a second embodiment of this invention.

In this embodiment, the second controller 25 executes the routine shown in FIG. 4 instead of the control routine shown in FIG. 2. This routine is executed at interval of 10 milliseconds, for example.

In the control routine shown in FIG. 2, when the number N of abnormalities is greater than two, that is to say, when the number of inverters 30 with detected abnormalities is three or four, the torque control value for all the inverters 30 is set to zero and the operation of the motor/generator 20 is not performed.

In the control routine according to this embodiment, when the number N of abnormalities is greater than three, that is to say, when abnormalities are detected in all the inverters 30, similar processing as the above is performed. In other words, if there is at least one normally functioning inverter 30, the routine is programmed to continue operation of the motor/generator 20.

In order to materialize this criterion, the control routine as shown in FIG. 4 provides a step S11A instead of the step S11 in FIG. 2. Furthermore, steps S13A and S14A are added to the routine. The other steps are identical to those of the routine of FIG. 2 and designated by the same reference numerals in FIG. 4.

In the step S11A, it is determined whether or not the number N of abnormalities is less than or equal to three. In the step S14A, the number M of inverters 30 to be operated is set to one. In the step S13A, the torque command signal Tq and a third fixed torque T3 are compared and on the basis of this result, the number M of inverters 30 to be operated is set to 3 or 4. The third fixed torque T3 is set to a larger value than the second fixed torque T2.

In this embodiment, if at least one inverter 30 is operating normally, the operation of the motor/generator 20 is continued. The values of the number M set when the torque control value Tm is smaller than the first fixed torque T1 and the value of the number M set when the torque control value Tm is smaller than the second fixed torque T2 are smaller than the corresponding values for M in the first embodiment. Thus the values of the first fixed torque T1 and the second fixed torque T2 used in this embodiment are smaller than the values used in the first embodiment.

Figure 5:
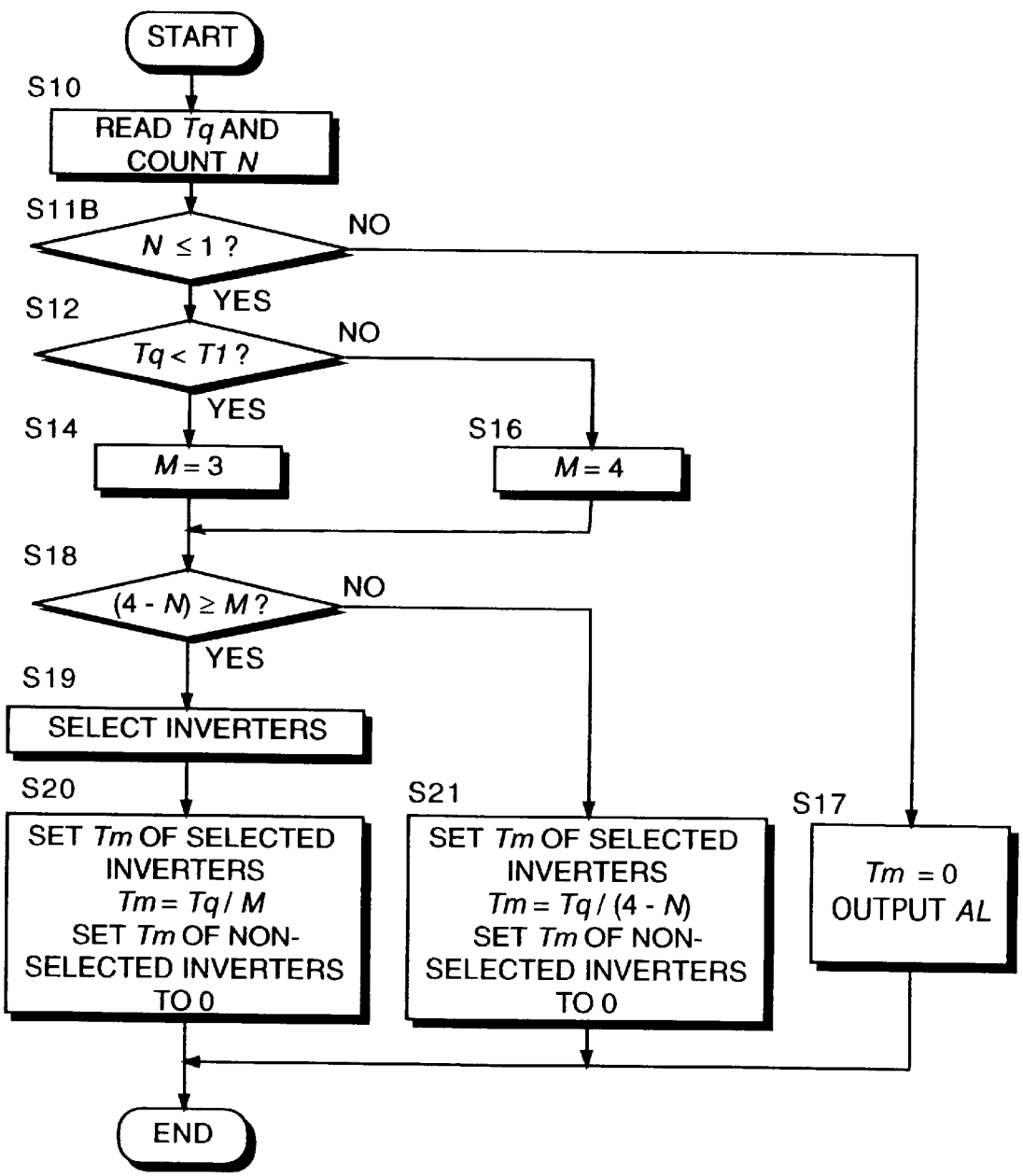
FIG. 5 is similar to FIG. 3, but showing the second embodiment of this invention.

FIG. 5 shows a control routine executed by the second controller 25 according to a third embodiment of this invention.

In this embodiment, the second controller 25 executes the control routine shown in FIG. 5 instead of the control routine shown in FIG. 2. This routine is executed at interval of 10 milliseconds, for example.

In the control routine shown in FIG. 5, when the number N of abnormalities is greater than one, that is to say, when the number of inverters 30 with detected abnormalities is two or more, the torque control value for all the inverters 30 is set to zero and the operation of the motor/generator 20 is not performed. Operation of the motor/generator 20 is performed only when the number of normally operating inverters 30 is greater than three.

In order to materialize this criterion, the control routine shown in FIG. 5 provides a step S11B instead of the step S11 in FIG. 2. Furthermore the steps S13 and S14 in FIG. 2 are omitted from the routine. The other steps are identical to those of the routine of FIG. 2 and designated by the same reference numerals in FIG. 5.

In the step S11B, it is determined whether or not the number N above is less than or equal to one. In the step S12, when the torque control value Tm is greater than or equal to the first fixed torque T1, the number M is set to 4 in the step S16. When the torque control value is less than or equal to the first fixed torque T1 the number M is set to 3 in the step S15.

In this embodiment, the number M which is set by the routine when the torque control value Tm is smaller than the first fixed torque T1 is greater than the number M set by the routine under the same conditions in the first embodiment. Thus the first fixed torque T1 used in this embodiment is set to a larger value than that used in the first embodiment.

As shown in the first to third embodiments, it is possible to operate an arbitrary number of inverters 20 with respect to a number N of abnormally operating inverters 30 in response to the operating conditions of the motor/generator 20.

Figure 6:
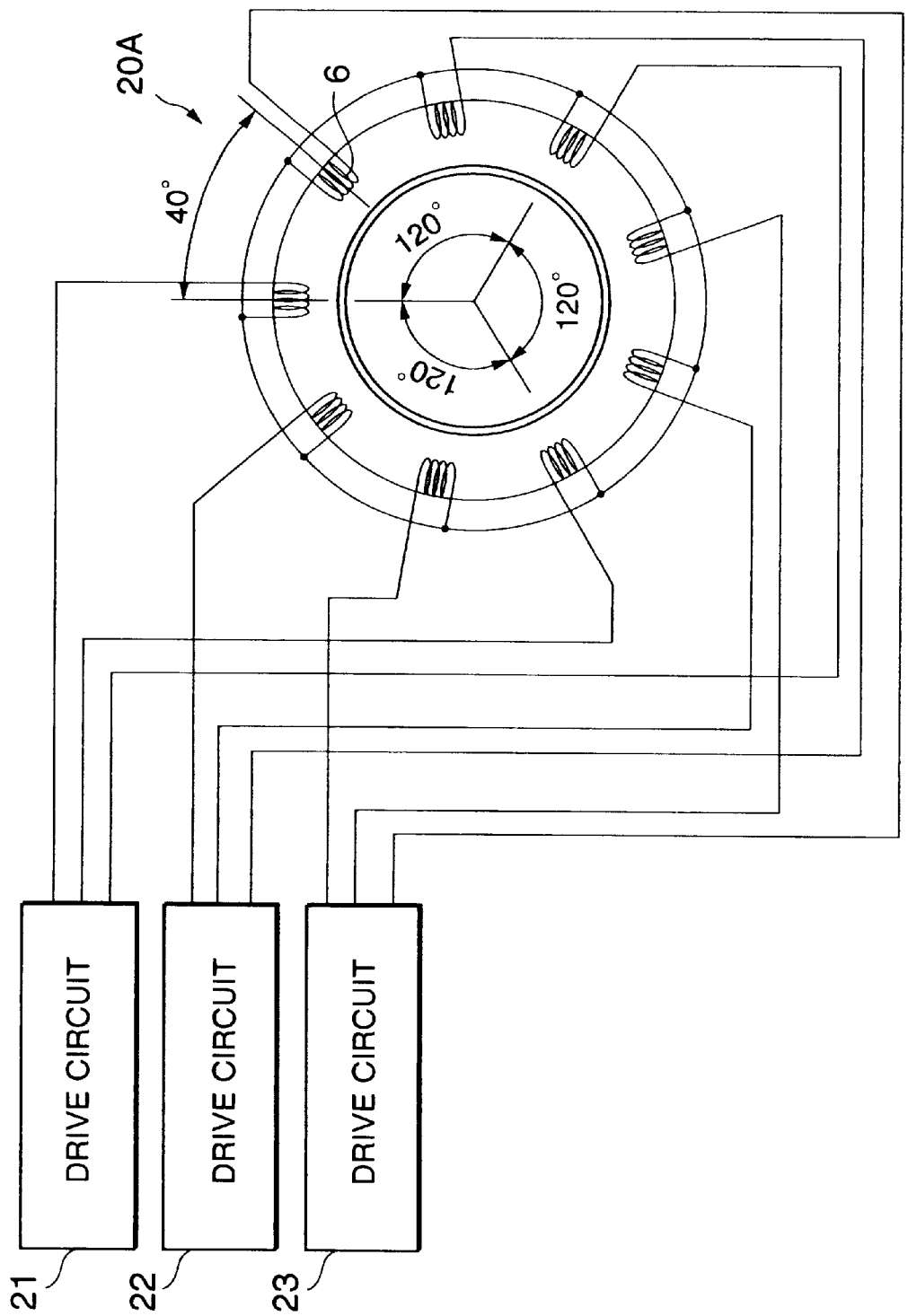
FIG. 6 is a circuit diagram of a controller for a motor/generator according to a fourth embodiment of this invention.

A fourth embodiment of this invention will now be described referring to FIG. 6.

All of the first to third embodiments above are applied to a motor/generator 20 driven by a twelve-phase AC current using four types of three-phase AC current. However this embodiment is applied to a motor/generator 20 driven by a nine-phase AC current using three types of three-phase AC current which results in one fewer drive circuit 21, 22, 23 as shown in FIG. 6 than in the first to third embodiments.

In this way, this invention may be applied to the control of a motor/generator that runs with a plurality of polyphase AC currents.

The contents of Tokugan Hei 11-335351, with a filing date of Nov. 26, 1999 in Japan and U.S. Pat. No. 6,049,152 (application Ser. No. 09/275,785) are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A controller for a motor/generator, the motor/generator having a plurality of groups of coils and being operated by supplying a polyphase alternating current to each of the plurality of groups of coils, the controller comprising:

a plurality of inverters each converting a direct current into the polyphase alternating current and supplying the polyphase alternating current to each of the plurality of groups of coils in response to an input signal, each inverter being provided with a voltage step up converter which raises a voltage of a direct current supplied to a corresponding inverter;

a sensor which detects an abnormality in each inverter; and a microprocessor programmed to:
control the input signal to an abnormal inverter that has an abnormality to stop supplying the polyphase alternating current; and
control a voltage step up converter corresponding to a normal inverter to increase a voltage of the direct current supplied to the normal inverter as a number of abnormal inverters increases.

2. The controller as defined in claim 1, wherein the controller further comprises a sensor which detects a load of the motor/generator, and the microprocessor is further programmed to compare the load with a reference load, and control the input signal to a specific inverter to stop supplying the polyphase alternating current when the load is smaller than the reference load.

3. The controller as defined in claim 1, wherein the microprocessor is further programmed to calculate a torque control value by dividing a target torque corresponding to the load by a number of the normal inverters, calculate a target current based on the torque control value, and control a normal inverter via the corresponding voltage step up converter to supply the polyphase alternating current equal to the target current.

4. The controller as defined in claim 3, wherein the microprocessor comprises a first microprocessor and a second microprocessor wherein the first microprocessor is provided on each inverter and is programmed to calculate the target current based on the torque control value, control the corresponding inverter via the corresponding voltage step up converter to supply the polyphase alternating current equal to the target current, and the second microprocessor is programmed to count the number of the normal inverters based on an output of the abnormality detecting sensor, calculate the torque control value by dividing the target torque by the number of the normal inverters, and output the torque control value to the first microprocessor.

5. The controller as defined in claim 4, wherein the controller further comprises a battery supplying a direct current to each of the voltage step up converters, each of the voltage step up converters comprises a voltage step up control circuit which controls a current applied to the inverters from the battery via the voltage step up converter, and a regeneration control circuit which controls a current applied to the battery from the inverter via the voltage step up converter, and the first microprocessor is further programmed to determine whether or not the torque control value is negative and selectively activating the regeneration control circuit and the voltage step up control circuit according to a result of determination.

6. The controller as defined in claim 1, wherein the abnormality detecting sensor comprises a sensor which detects a temperature of each inverter, and the microprocessor is further programmed to determine the abnormality of each inverter by comparing the temperature of each inverter with a reference temperature.

7. The controller as defined in claim 1, wherein the abnormality detecting sensor comprises a sensor which detects an output current of each inverter, and the microprocessor is further programmed to determine the abnormality of each inverter by determining whether or not the output current of each inverter is in a fixed range.

8. A controller for a motor/generator, the motor/generator having a plurality of groups of coils and being operated by supplying a polyphase alternating current to each of the plurality of groups of coils, the controller comprising:

a plurality of inverters each converting a direct current into the polyphase alternating current and supplying the polyphase alternating current to each of the plurality of groups of coils in response to an input signal, each inverter being provided with a voltage step up converter which raises a voltage of a direct current supplied to a corresponding inverter;

means for detecting an abnormality in each inverter;

means for controlling the input signal to an abnormal inverter that has an abnormality to stop supplying the polyphase alternating current; and means for controlling a voltage step converter corresponding to a normal inverter to increase a voltage of the direct current supplied to the normal inverter as a number of abnormal inverters increases.

9. A control method of a plurality of inverter which drive a motor/generator, the motor/generator comprising a plurality of groups of coils and each of the inverters converting a direct current into a polyphase alternating current and supplying the polyphase alternating current to each of the plurality of groups of coils in response to an input signal, the method comprising:

detecting an abnormality in each inverter;

controlling the input signal to an abnormal inverter that has an abnormality to stop supplying the polyphase alternating current; and controlling a voltage step up converter corresponding to a normal inverter to increase a voltage of the direct current supplied to the normal inverter as a number of abnormal inverters increases.

* * * * *